May 6, 1958     K. J. PELTZ     2,833,078

SONIC FISHING LURE

Filed Sept. 24, 1956

INVENTOR.
KENNETH J. PELTZ
BY
ATTORNEY.

United States Patent Office 2,833,078
Patented May 6, 1958

2,833,078

SONIC FISHING LURE

Kenneth J. Peltz, Woodbury, N. J.

Application September 24, 1956, Serial No. 611,649

5 Claims. (Cl. 43—42.31)

The present invention relates to fishing lures and is concerned particularly with a fishing lure which has as its primary attraction for fish the sonic vibrations which are created by mechanism within the lure.

It has been recognized that fish may be attracted by sound and sonic vibrations which are transmitted from a sound-creating device to the water. It has also been established that fish are attracted by moving colored elements.

With the foregoing conditions in mind, the present invention has in view as its foremost objective the provision of a sonic fishing lure including all of the elements above enumerated, which cooperate in attracting fish to the lure.

More in detail, the invention has as an object the provision of a sonic fishing lure which consists essentially of a casing that is adapted to move through the water under the influence of a line to which it is attached; a mechanical device within the casing for creating sound and which involves moving parts; a propeller carried by the casing exteriorly thereof and operatively connected to the sound-producing mechanism within the casing; and a sonifer projecting exteriorly of the casing and connected to the sound-producing mechanism therewithin for transmitting sound-emitting vibrations from the casing to the water exteriorly thereof.

It is evident that, as the fishing lure is moved through the water under the influence of a line to which it is connected, the propeller is rotated; and this rotative movement is transmitted to the sound-producing mechanism to cause operation thereof, and the vibrations of the latter are transmitted by the sonifer to the water exteriorly of the casing.

Still another object of the invention is to provide, in a sonic fishing lure of the character indicated, sound-producing mechanism which consists essentially of a shaft that is journalled in the casing and which shaft drivably carries a disc having a serrated or toothed peripheral edge. Engaging the serrated edge is one end of a sonifer in the form of a spring wire. As the disk is rotated by the propeller that is attached to the shaft carrying the disc, the movement of the teeth of the serrated edge over the end of the sonifer with which it engages creates sound and sets up vibrations in the sonifer.

A sonic fishing lure made in accordance with the above-noted objectives is particularly adapted to include the feature of attracting fish by rapidly moving colored elements. Thus, another object of the invention is to provide, in a sonic fishing lure of the type aforesaid, a casing which is at least partially transparent and a serrated disc that is divided into differently colored segments that are visible through the transparent portions of the casing. As the fishing lure is moved through the water, the rotating disc having the differently colored segments will be effective to supplement the sonic vibrations in attracting fish.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a sonic fishing lure that consists essentially of a casing that is adapted to be attached to a fishing line; sound-producing mechanism within the casing comprising a journaled shaft with a disc having a serrated edge drivably mounted thereon; a propeller carried by the shaft exteriorly of the casing; and a sonifer having one end in operative engagement with the serrated edge of the disc and the other end located exteriorly of the casing, with a portion of the casing being transparent and the disc including differently colored segments.

For a full and more complete understanding of the invention, reference may be had to the following description and accompanying drawing, wherein.

Figure 1:
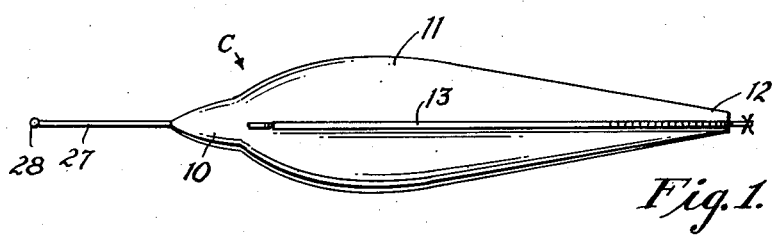
Figure 1 is a top plan view of a sonic fishing lure designed in accordance with the precepts of this invention.
Figure 2:
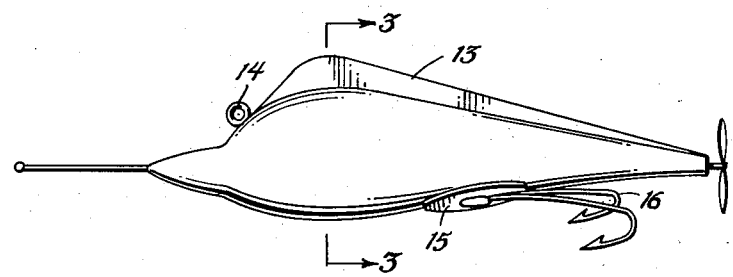
Figure 2 is a view in side elevation taken normal to the showing of Figure 1.

Referring now to the drawing, wherein like reference characters denote corresponding parts, and first more particularly to Figures 1 and 2, the fishing lure of this invention is therein illustrated as including as a basic and essential element a casing which is referred to in its entirety by the reference character C. This casing C may be made from any appropriate material, although the invention has particularly in mind the use of certain plastics, such as those which are transparent. The casing C comprises a nose 10 at the forward end, a main body portion 11 of bulging formation, and a tail 12. Extending across the top of the main body portion 11 to the tail 12 is a vane or fin 13 which serves to impart a proper directional movement to the casing and hold it in line as it is drawn through the water. An eye 14 is secured to the casing just back of the nose, and is adapted to have a fishing line attached thereto. A hook-carrying member 15 is preferably secured to the underside of the main body portion 11 and carries one or more hooks such as shown at 16.

Figure 4:
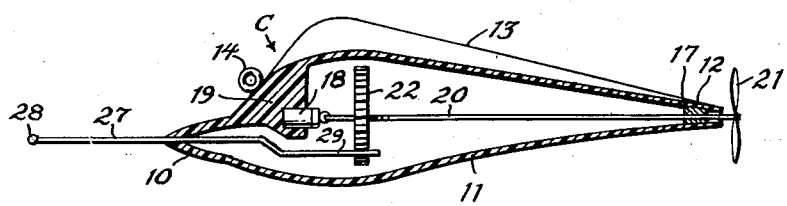
Figure 4 is a longitudinal vertical section taken about on the planes represented by the line 4—4 of Figure 3.

Referring now more particularly to Figure 4, the casing C is therein illustrated as being hollow. A bearing 17 is fixedly secured in the tail 12, and a second bearing 18 is mounted in a web 19 or similar structure that is formed as a part of the main body portion. Journalled in these bearings 17 and 18 is a shaft 20. This shaft 20 extends beyond the tail 12; and at its free end is provided with a propeller 21 of a well-known type, which is drivably connected to the shaft 20.

Figure 3:
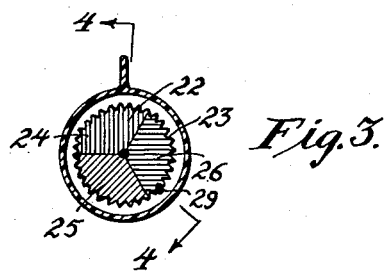
Figure 3 is a transverse vertical section taken about on the plane represented by the line 3—3 of Figure 2.

A disc 22 having a serrated edge providing teeth 23 is drivably mounted on the shaft 20 to be rotated thereby. This disc 22 may be divided into a plurality of colored segments as shown at 24, 25, and 26 in Figure 3.

A sonifer 27 is mounted in the nose 10 and extends forwardly thereof an appreciable distance, being formed with a small ball 28 on its free end. The sonifer 27 includes an offset portion 29 within the casing C which is in engagement with the teeth 23.

*Operation*

With a fishing line secured to the eye 14, it will be assumed that this line imparts a drag or pull to the casing C to move the latter through the water; and the fin 13 will maintain the casing in proper alignment with respect to the path of movement. This movement creates the effect of water on the propeller 21 to cause the latter to rotate the shaft 20. This in turn rotates the disc 22. As the latter turns, the teeth 23 move over the offset portion 29 of the sonifer 27 to generate sound and set up vibrations in the sonifer. As the sonifer 27 projects exteriorly of the casing, these vibrations are transmitted to the water to attract the fish. At the same time, the disc 22 having the differently colored segments is rotated and is visible through the transparent portions of the casing. This further attracts the fish in a visible manner. As the fish are attracted, strikes are made at the hooks 16 in accordance with well-recognized fishing practices.

While a preferred specific emobodiment of the invention is hereinbefore set forth, it is to be clearly understood that the invention is not to be limited to the exact materials, mechanisms, and devices illustrated and described, because various modifications of these details may be provided in putting the invention into practice within the purview of the appended claims.

What is claimed is:

1. In a sonic fishing lure, a hollow casing having a nose and a tail, a shaft journalled in said casing and having an end extending exteriorly of said casing at said tail, a propeller drivably carried by said shaft exteriorly of said casing, a sonifer mounted in the nose of said casing, and sound-producing mechanism in said casing operatively connected to said shaft and to said sonifer.

2. In a sonic fishing lure, a hollow casing having a nose and a tail, a shaft journalled in said casing and having an end extending exteriorly of said casing at said tail, a propeller drivably carried by said shaft exteriorly of said casing, a sonifer mounted in the nose of said casing, and a disc drivably carried by said shaft within said casing and having a serrated edge in engagement with said sonifer.

3. In a sonic fishing lure; a hollow casing a portion of which is transparent, and having a nose, a main body portion, and a tail; a fin extending lengthwise of said casing; means for attaching a line to said casing between said fin and said nose; a hook secured to said casing exteriorly thereof; a bearing in said tail; a second bearing within said casing at the forward end of said main body portion; a shaft journalled in said bearings and having an end disposed exteriorly of said tail; a propeller drivably carried by said end of said shaft; a disc including differently colored segments and a serrated edge drivably carried by said shaft within said main body portion; and a sonifer mounted in said nose, extending forwardly of said casing and having an offset portion in engagement with the serrated edge of said disc.

4. In a sonic fishing lure, a hollow casing, sound-producing mechanism within said casing in the form of a disc having a serrated edge and a sonifer in engagement with said serrated edge, and means for operating said sound-producing mechanism being adapted to be actuated by the movement of said casing through water.

5. In a sonic fishing lure, a hollow casing having a nose, a sonifer mounted in said nose having a portion extending forwardly of the nose and another portion extending into the hollow within said casing, sound-producing mechanism within said casing operatively connected to said sonifer, and means for operating said sound-producing mechanism being adapted to be actuated by the movement of said casing through water.

References Cited in the file of this patent

UNITED STATES PATENTS

| | | |
|---|---|---|
| 2,757,475 | Pankove | Aug. 7, 1956 |
| 2,784,399 | Smith | Mar. 5, 1957 |